United States Patent [19]

Allred

[11] Patent Number: 5,215,037

[45] Date of Patent: Jun. 1, 1993

[54] BICYCLE-MOUNTED SWINGARM DEVICE FOR EXERCISING A DOG

[76] Inventor: Terry H. Allred, 932 Evergreen Dr., Logan, Utah 84321

[21] Appl. No.: 800,457

[22] Filed: Nov. 26, 1991

[51] Int. Cl.⁵ .............................................. A01K 15/00
[52] U.S. Cl. ...................................... 119/29; 280/292
[58] Field of Search .................. 119/29, 96, 109, 111, 119/120, 121, 122; 280/288.4, 304.5, 292

[56] References Cited

U.S. PATENT DOCUMENTS

| | | | |
|---|---|---|---|
| 667,154 | 1/1901 | McDonald et al. | 280/292 |
| 704,871 | 7/1902 | Davis | 280/292 |
| 3,203,399 | 8/1965 | Bank | 119/120 |
| 3,896,769 | 7/1975 | McGehee | 119/122 |
| 4,134,364 | 1/1979 | Boncela | 119/29 |
| 4,261,592 | 4/1981 | Bussevil | 280/292 |
| 4,854,269 | 8/1989 | Arntzen | 119/29 |
| 4,928,985 | 5/1990 | Nowlin | 280/292 X |

*Primary Examiner*—Gene Mancene
*Assistant Examiner*—Thomas Price
*Attorney, Agent, or Firm*—John R. Flanagan

[57] ABSTRACT

A bicycle-mounted exercising device includes a mounting assembly attachable to a bicycle frame, an elongated swingarm having an inner end and an outer end for coupling to a flexible elastic strap attachable to a dog's collar, a pivot assembly connecting the inner end of the swingarm to the mounting assembly for pivotal movement of the swingarm relative to the bicycle about a generally vertical axis defined by the pivot assembly, and a mounting attachment connected to the mounting assembly for pivotal movement about the vertical axis and, in turn, supporting the swingarm closer to its inner end than to its outer end for pivotal movement about a generally horizontal axis. The pivot assembly includes a spring which engages and biases the inner end of the swingarm in a downward direction and thereby biases the outer end thereof in an upward direction. Pivoting of the swingarm about the vertical axis around the rear and between opposite sides of the bicycle permits a dog to have an expanded range of movement while keeping the dog away from the wheels of the bicycle. Pivoting of the swingarm about the horizontal axis against the load imposed by the spring on the inner end of the swingarm cushions and takes up any shock which might be produced in the device by the dog, while moving in any direction, reaching the end of the flexible elastic strap when attached to the outer end of the swingarm.

18 Claims, 2 Drawing Sheets

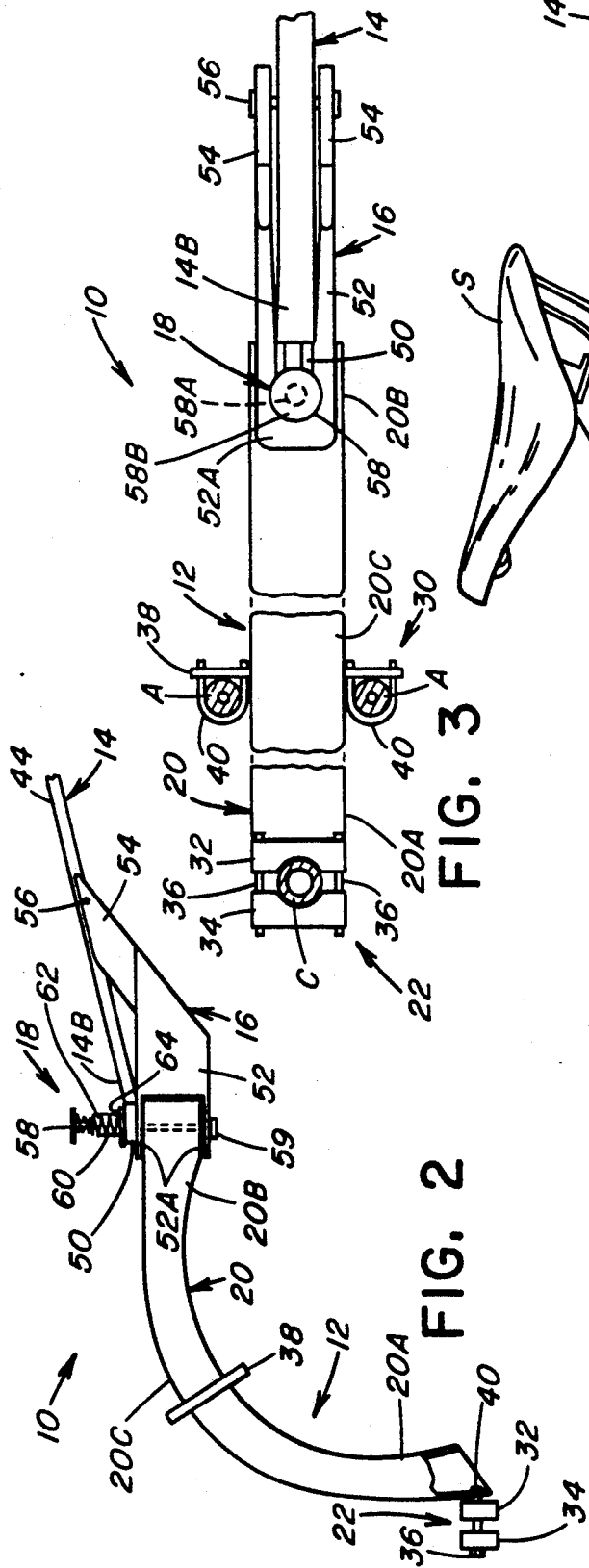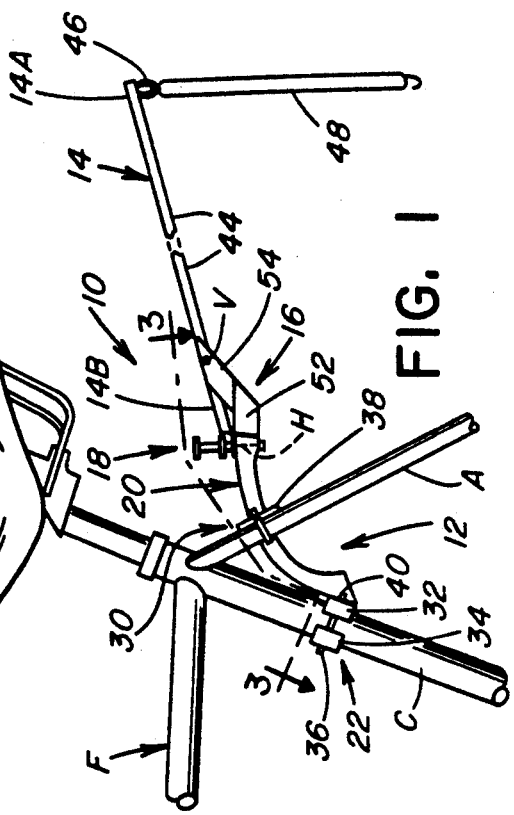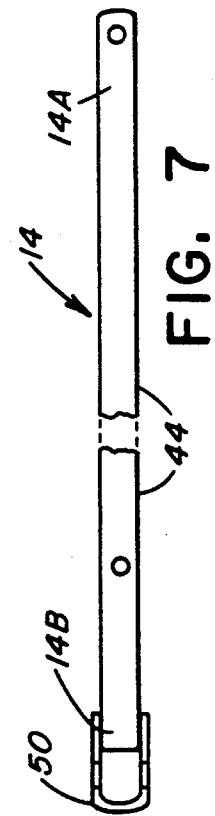

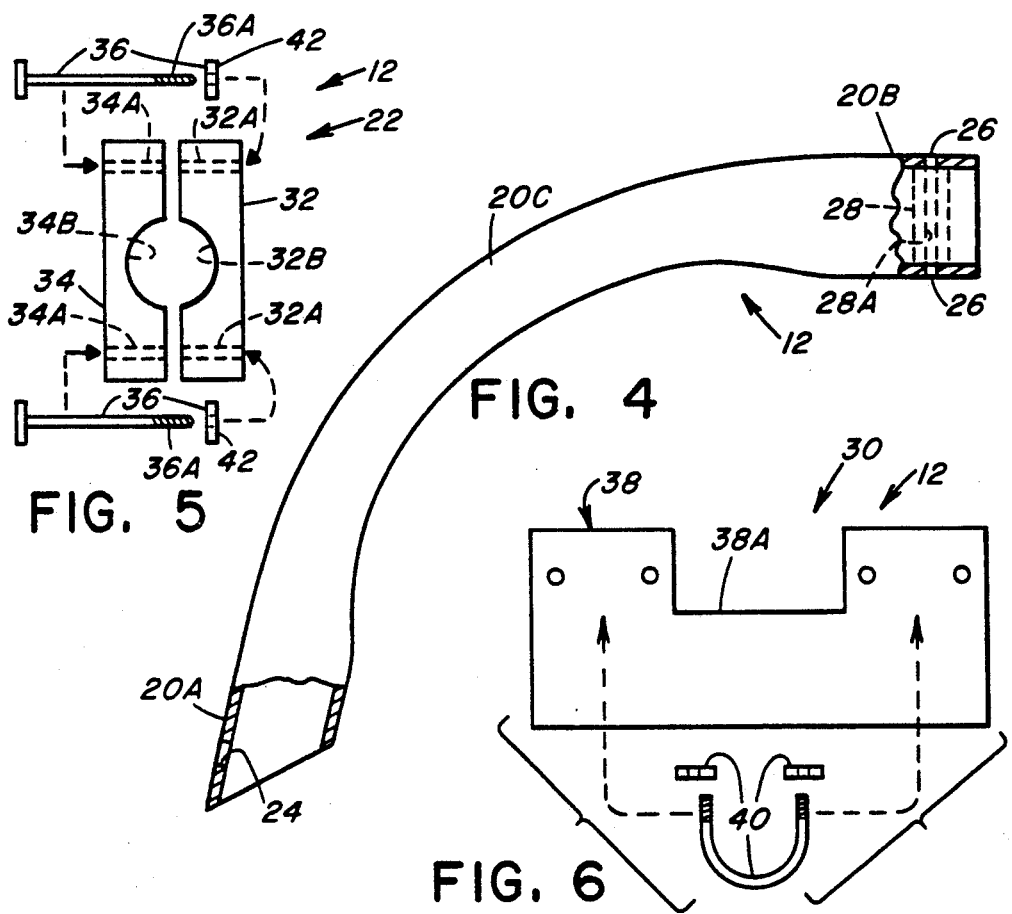
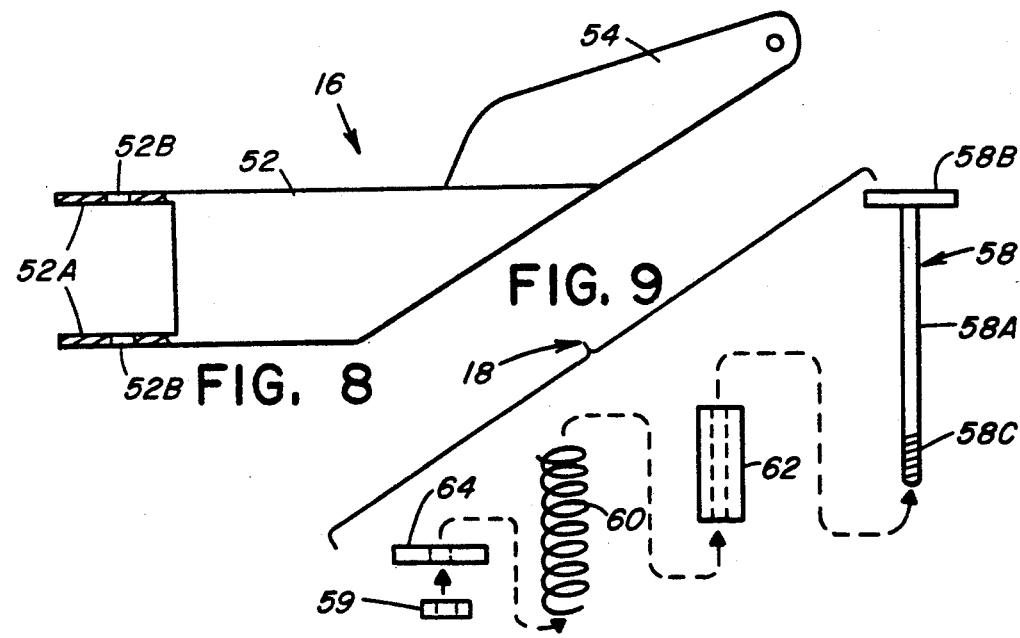

BICYCLE-MOUNTED SWINGARM DEVICE FOR EXERCISING A DOG

BACKGROUND OF THE INVENTION

1. Field of the Invention

The present invention generally relates a dog exercising device and, more particularly, is concerned with a bicycle-mounted swingarm device for exercising a dog while riding a bicycle.

2. Description of the Prior Art

Over the years, many people have exercised with their dogs by taking walks. However, walking does not provide sufficient exercise for people nor dogs unless undertaken for an extended period of time. In more recent years, more and more people have begun to jog and ride bicycles as a way to exercise with their dogs.

A typical way a person has exercised a dog while riding a bicycle has been to pedal the bicycle in the customary manner while holding the dog's leash in one hand or attaching the leash to the handlebars or other portion of the bicycle frame. While this manner of exercising provides the person and dog with a sufficient workout, it may expose the rider and dog to possible injury should the dog suddenly pull away from the bicycle or bump into the wheels or pedals.

Bicycle-mounted dog exercising devices designed to overcome these problems are known in the prior patent art. Representative examples of the prior art dog exercising devices are disclosed in U.S. Pat. No. 4,134,364 to Boncela and U.S. Pat. No. 4,854,269 to Arntzen. While these prior art devices may function reasonably well under the limited range of conditions for which they were designed, each device appears to embody one or more drawbacks which makes it less than an optimum design for the intended use and for avoiding the above-described problems.

For instance, the prior art device of Boncela employs a stand-off bar which is stationarily mounted at an inner end to the bicycle frame and extends laterally therefrom. The dog's leash is releasably secured to an outer end of the stand-off bar. A drawback of this device is that the stationarily-mounted stand-off bar limits the dog to running along only one side of the bicycle.

The prior art device of Arntzen employs an inner bar stationarily mounted to the bicycle frame, an outer bar to which the dog's leash is attached, and a resilient spring mounting the outer bar to the inner bar such that the outer bar can move relative to the inner bar in response to exertion of a force thereon by the dog's leash. A drawback of this device is that, although it is less restrictive than the device of Boncela, it still only slightly increases the range of movement for the dog.

Consequently, a need exists for a bicycle-mounted dog exercising device which will alleviate the above-mentioned problems and drawbacks of the prior art.

SUMMARY OF THE INVENTION

The present invention provides a bicycle-mounted exercising device designed to satisfy the aforementioned needs. In accordance with the present invention, the exercising device comprises: (a) a mounting assembly attachable to a bicycle frame; (b) an elongated swingarm having an inner end and an outer end for coupling to a flexible elastic strap attachable to a dog's collar; (c) a pivot assembly connecting the inner end of the swingarm to the mounting assembly for pivotal movement of the swingarm relative to the bicycle, for example, around the rear and between opposite sides of the bicycle, about a generally vertical axis defined by the pivot assembly; and (d) a mounting attachment supporting the swingarm and being connected to the mounting assembly for pivotal movement about the vertical axis such that pivoting of the swingarm with the mounting attachment about the vertical axis relative to the bicycle permits a dog to have an expanded range and freedom of movement while keeping the dog away from wheels of the bicycle.

Also, the swingarm is supported by the mounting attachment at a location closer to the inner end than to the outer end of the swingarm for pivotal movement about a generally horizontal axis. Further, the pivot assembly includes an elongated pivot element mounted to the mounting assembly along the vertical axis and a spring mounted to the pivot element and engaging and biasing the inner end of the swingarm in a downward direction and thereby biasing its outer end in an upward direction. Pivoting of the swingarm about the horizontal axis against the load imposed by the biasing spring on the inner end of the swingarm cushions and takes up any shock which might be produced in the device by a dog, while moving in any direction, reaching the end of the elastic strap attached to the outer end of the swingarm. The elasticity of the flexible strap also helps to absorb the shock.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a fragmentary side elevational view of a bicycle with a dog exercising device of the present invention being mounted thereto.

FIG. 2 is an enlarged side elevational view of the exercising device removed from the bicycle.

FIG. 3 is an enlarged top plan view of the exercising device as seen along line 3—3 of FIG. 1.

FIG. 4 is an enlarged side elevational view of a mounting bracket of a mounting assembly of the exercising device of FIG. 2.

FIG. 5 is an enlarged exploded view of clamps of the mounting assembly of the exercising device of FIG. 2.

FIG. 6 is an enlarged exploded view of of a mounting plate and fasteners of the mounting assembly of the exercising device of FIG. 2.

FIG. 7 is an enlarged side elevational view of an elongated swingarm of the exercising device of FIG. 2.

FIG. 8 is an enlarged side elevational view of a mounting attachment of the exercising device of FIG. 2.

FIG. 9 is an enlarged exploded view of a pivot assembly of the exercising device of FIG. 2.

DETAILED DESCRIPTION OF THE INVENTION

Referring to the drawings and particularly to FIGS. 1-3, there is illustrated a dog exercising device, generally designated 10, of the present invention mounted to the frame F of a bicycle generally below the bicycle seat S. The dog exercising device 10 basically includes a mounting assembly 12, an elongated swingarm 14, a mounting attachment 16, amd a pivot assembly 18.

Referring to FIGS. 1–6, the mounting assembly 12 of the exercising device 10, which is attachable to the bicycle frame F, includes an elongated arcuate-shaped mounting bracket 20 having spaced opposite ends 20A, 20B, and clamping means 22 for attaching one end 20A of the mounting bracket 20 to a rear column C of the bicycle frame F. The mounting bracket 20 has a pair of holes 24 defined side-by-side one another in its one end 20A and a pair holes 26 defined opposite to one another in its other end 20B and a hollow tube 28 fixed to the other end 20B with a passage 28A aligned with the holes 26. Also, the mounting assembly 12 includes connecting means 30 coupling the mounting bracket 20 to a pair of parallel rear arms A of the bicycle frame F at a midsection 20C of the mounting bracket 20 disposed at the middle thereof between its opposite ends 20A, 20B.

More particularly, the clamping means 22 includes a pair of substantially identical clamp members 32, 34 and a pair of fasteners 36 for securing the clamp members 32, 34 to one another and to the one end 20A of the mounting bracket 20. Each clamp member 32, 34 has a pair of bores 32A, 34A defined in parallel relation to one another through opposite ends of the clamp member, and a semi-circular recess 32B, 34B defined in one side of the middle of the clamp member.

The connecting means 30 includes a mounting plate 38 and a pair of U-shaped bolts 40. The mounting plate 38 has a notch 38A formed in its upper side through which the plate 38 receives and supports the mounting bracket 20 at the midsection 20C thereof. For supporting the mounting bracket 20, the mounting plate 38 is placed between the rear arms A of the bicycle frame F, and then U-shaped bolts 40 are fitted over the rear arms A and attached to the opposite ends of the mounting plate 38. The mounting bracket 20 rests at its midsection 20C in the notch 38A of the mounting plate 38.

For attaching the mounting bracket 20 to the bicycle frame F, first, the fasteners 36 are inserted through the pair of holes 24 in the one end 20A of the mounting bracket so that threaded ends 36A of the fasteners 36 project outwardly away from the mounting bracket 20. Next, one clamp member 32 is inserted over the threaded ends 36A of the fasteners 36 and positioned on one side of the rear column C of the bicycle frame F, with the frame column C received in the recess 32B of the clamp member 32. Then, the other clamp member 34 is inserted over the threaded ends 36A of the fasteners 36 and positioned on the opposite side of the rear column C of the bicycle frame F, with the frame column C received in the recess 34B of the clamp member 34. Finally, nuts 42 are threaded and tightened on the threaded ends 36A of the fasteners 36 until the clamp members 32, 34 are tightly fitted and secured about the rear column C of the bicycle frame F.

Referring to FIGS. 1–3 and 7–9, the elongated swingarm 14 of the exercising device 10 is pivotally supported by the mounting attachment 16 about a generally horizontal axis H and pivotally connected to the mounting assembly 12 about a generally vertical axis V by the pivot assembly 18. The swingarm 14 includes an elongated hollow tube 44 having an eyebolt 46 mounted thereto at the outer end 14A of the swingarm 14. A flexible elasticized rubber strap 48 is coupled to the eyebolt 46 and attachable to a dog's collar. The swingarm 14 also includes a connector strap 50 attached to the tube 44 at an inner end 14B of the swingarm 14 at a slight angle to the longitudinal extent of the swingarm 14, for example, five degrees.

The mounting attachment 16 of the exercising device 10 includes a support member 52 having a bifurcated end 52A connected to the mounting assembly 12 for pivotal movement about the vertical axis V. The mounting attachment 16 also includes a pair of tabs 54 rigidly attached to and extending in rearwardly inclined relation from the support member 52. The tabs 54 are laterally spaced apart from one another and receive the swingarm 14 therebetween. A pivot pin 56, mounted to and extending between the opposite upper ends of the tabs 54 and through the swingarm 14, defines the horizontal axis H. The pivot pin 56 supports the swingarm 14 closer to its inner end 14B than to its outer end 14A for pivotal movement about the generally horizontal axis H. The inner end 14B of the swingarm 14 is connected to the pivot assembly 18 at an elevation lower than the elevation of the pivot pin 56 such that the swingarm 14 is thereby supported by the mounting attachment 16 so as to extend outwardly in an upwardly inclined orientation.

Referring to FIGS. 1–3 and 9, the pivot assembly 18 includes an elongated pivot element 58 in the form of bolt having an elongated stem 58A, a head 58B at the upper end of the stem 58A and a threaded portion 58C at the lower end portion of the stem 58A. The pivot element 58 is mounted through the bracket holes 26 and hollow tube 28 at the upper end 20B of the mounting bracket 20 and define the vertical axis V. The pivot element 58 also extends through a pair of holes 52B defined in the bifurcated end 52A of the support member 52 of the mounting attachment 16 which align with the brackets holes 26 and hollow tube 28 to mount the mounting attachment 16 to the upper end 20B of the mounting bracket 20 for pivotal movement about the vertical axis V. A nut 59 is threaded on the lower threaded end 58C of the pivot element 58.

The pivot assembly 18 also includes a coiled spring 60 and a hollow sleeve 62, the sleeve 62 being shorter in length than the spring 60 and inserted through the spring. The spring 60 with the sleeve 62 are installed on the stem 58A of the pivot element 58 and located above the upper end 20B of the mounting bracket 20.

The connector strap 50 at the inner end 14B of the swingarm 14 is installed about the stem 58A of the pivot element 58 below the spring 60 and sleeve 62. Also, a washer 64 is installed on the stem 58A between the connector strap 50 and the spring 60 and sleeve 62. The spring 60 at the upper end engages the head 58B of the pivot element 58 and at the lower end engages the washer 64. Thus, the spring 60 through the washer 64 biases the inner end 14B of the swingarm 14 in a downward direction and thereby biasing the outer end 14A of the swingarm 14 in an upward direction such that the swingarm 14 normally is disposed in the rearwardly inclined orientation shown in FIGS. 1 and 2. The sleeve 62 acts as a stop which limits the distance through which the swingarm 14 can pivot clockwise as viewed in FIGS. 1 and 2.

Thus, the pivot assembly 18 of the exercising device 10 connects the inner end 14B of the swingarm 14 and the bifurcated end 52A of the mounting attachment support member 52 to the upper end 20B of the mounting bracket 20 for pivotal movement of the swingarm 14, through an approximately 360° arc around the rear and between opposite sides of the bicycle frame F about the generally vertical axis V defined by the pivot assembly 18. Further, the tabs 54 of the mounting attachment 16 and the pivot assembly 18 cooperate to support the swingarm 14 for pivotal movement vertically through a short arc about the horizontal axis H. Pivoting of the swingarm 14 about the vertical axis V around the rear and between opposite sides of the bicycle permits a dog to have an expanded range of movement while keeping the dog away from the wheels of the bicycle. Pivoting of the swingarm 14 about the horizontal axis H against the load of the biasing spring 60 cushions and takes up the shock which would otherwise be produced in the device 10, upon the dog, when moving in any direction, reaching the end of the elastic strap 48 attached to the outer end 14A of the swingarm 14. Of course, pivoting of the swingarm 14 can occur concurrently about the vertical and horizontal axes V, H. The elasticity of the flexible strap 48 also helps to absorb the shock.

It should be understood that the terms "bicycle" and "dog" have been used herein for purposes of brevity and convenience. It is intended that the term "bicycle" include any other vehicle with which use of the device 10 might be found desirable and appropriate. Also, it is intended that the term "dog" include any other animal with which use of the device 10 might be found desirable and appropriate. Therefore, the use of the terms "bicycle" and "dog" should not be construed as limitations on the exercising device 10 itself.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A bicycle-mounted exercising device for exercising a dog while riding a bicycle, said device comprising:
   (a) a mounting assembly attachable to a bicycle frame;
   (b) an elongated swingarm having an inner end and an outer end for coupling to a flexible elastic strap attachable to a dog's collar;
   (c) a pivot assembly connecting said inner end of said swingarm to said mounting assembly for pivoting movement of said swingarm relative to the bicycle about a generally vertical axis defined by said pivot assembly; and
   (d) a mounting arrangement supporting said swingarm at a location on said swingarm being closer to said inner end than to said outer end thereof from pivotal movement about a generally horizontal axis, said mounting attachment also being connected to said mounting assembly for pivotal movement about said vertical axis such that pivoting of said swingarm about said horizontal and vertical axes relative to the bicycle permits a dog to have an expanded range of movement while keeping the dog away from wheels of the bicycle.

2. The exercising device of claim 1 wherein said mounting assembly includes:
   an elongated mounting bracket having spaced opposite ends; and
   a pair of clamp members, one of said clamp members being attached to one of said opposite ends of said mounting bracket, the other of said clamp members being attachable to said one of said clamp members such that said clamp members can be fitted and secured about a portion of the bicycle frame.

3. The exercising device of claim 1 wherein said swingarm is supported by said mounting attachment so as to extend outwardly in an upwardly inclined orientation.

4. The exercising device of claim 1 wherein said pivot assembly includes an elongated pivot element mounted to said mounting assembly along said vertical axis and a spring mounted to said pivot element and engaging and biasing said inner end of said swingarm in a downward direction and thereby biasing said outer end of said swingarm in an upward direction such that pivoting of said swingarm about said horizontal axis against the load imposed by said biasing spring on said inner end of said swingarm cushions and takes up any shock which might be produced in the device by a dog, while moving in any direction, reaching the end of the flexible elastic strap when attached to said outer end of said swingarm.

5. The exercising device of claim 4 wherein said mounting assembly includes:
   an elongated mounting bracket having spaced opposite ends; and
   a pair of clamp members, one of said clamp members being attached to one of said opposite ends of said mounting bracket, the other of said clamp members being attachable to said one of said clamp members such that said clamp members can be fitted and secured about a portion of the bicycle frame.

6. The exercising device of claim 5 wherein said mounting assembly also includes means for connecting said mounting bracket to another portion of the bicycle frame at a location on said mounting bracket between said opposite ends thereof.

7. A bicycle-mounted exercising device for exercising a dog while riding a bicycle, said device comprising:
   (a) a mounting assembly attachable to a bicycle frame;
   (b) an elongated swingarm having an inner end and an outer end for coupling to a flexible elastic strap attachable to a dog's collar;
   (c) a pivot assembly connecting said inner end of said swingarm to said mounting assembly for movement of said inner end of said swingarm away from and toward said mounting assembly; and
   (d) a mounting attachment mounted to said mounting assembly and defining a horizontal axis, said mounting attachment supporting said swingarm for pivotal movement about said horizontal axis and relative to the bicycle frame;
   (e) said pivot assembly including an elongated element mounted to said mounting assembly and a spring mounted to said elongated element and engaging and biasing said inner end of said swingarm in a downward direction and thereby biasing said outer end of said swingarm in an upward direction such that pivoting of said swingarm about said horizontal axis against the load imposed by said biasing spring on said inner end of said swingarm cushions and takes up any shock which might be produced in the device by a dog, while moving in any direction, reaching the end of the flexible elastic strap when attached to said outer end of said swingarm.

8. The exercising device of claim 7 wherein said mounting assembly includes:

an elongated mounting bracket having spaced opposite ends;

a pair of clamp members, one of said clamp members being attached to one of said opposite ends of said mounting bracket, the other of said clamp members being attachable to said one of said clamp members such that said clamp members can be fitted and secured about a portion of the bicycle frame.

9. The exercising device of claim 7 wherein said said swingarm is supported by said mounting attachment at a location on said swingarm being closer to said inner end than to said outer end thereof for pivotal movement about said horizontal axis.

10. The exercising device of claim 9 wherein said swingarm is supported by said mounting attachment so as to extend outwardly in an upwardly inclined orientation.

11. The exercising device of claim 7 wherein said mounting assembly includes:

an elongated mounting bracket having spaced opposite ends; and a pair of clamp members, one of said clamp members being attached to one of said opposite ends of said mounting bracket, the other of said clamp members being attachable to said one of said clamp members such that said clamp members can be fitted and secured about a portion of the bicycle frame.

12. The exercising device of claim 11 wherein said mounting assembly also includes means for connecting said mounting bracket to another portion of the bicycle frame at a location on said mounting bracket between said opposite ends thereof.

13. A bicycle-mounted exercising device for exercising a dog while riding a bicycle, said device comprising:

(a) a mounting assembly attachable to a bicycle frame;

(b) an elongated swingarm having an inner end and an outer end for coupling to a flexible elastic strap attachable to a dog's collar;

(c) a pivot assembly connecting said inner end of said swingarm to said mounting assembly for pivotal movement of said swingarm relative to the bicycle about a generally vertical axis defined by said pivot assembly, said pivot assembly including an elongated pivot element mounted to said mounting assembly along said vertical axis and a spring mounted to said pivot element and engaging and biasing said inner end of said swingarm in a downward direction and thereby biasing said outer end of said swingarm in an upward direction; and (d) a mounting attachment supporting said swingarm and being connected to said mounting assembly for pivotal movement about said vertical axis such that pivoting of said swingarm with said mounting attachment about said vertical axis relative to the bicycle permits a dog to have an expanded range of movement while keeping the dog away from wheels of the bicycle, said mounting attachment also supporting said swingarm for pivotal movement relative to the bicycle frame about a horizontal axis such that pivoting of said swingarm about said horizontal axis and against the load imposed by said biasing spring on said inner end of said swingarm cushions and takes up any shock which might be produced in the device by a dog, while moving in any direction, reaching the end of the flexible elastic strap when attached to said outer end of said swingarm.

14. The exercising device of claim 13 wherein said swingarm is supported by said mounting attachment at a location on said swingarm being closer to said inner end than to said outer end thereof for pivotal movement about said horizontal axis.

15. The exercising device of claim 14 wherein said swingarm is supported by said mounting attachment so as to extend outwardly in an upwardly inclined orientation.

16. The exercising device of claim 14 wherein said mounting assembly includes:

an elongated mounting bracket having spaced opposite ends; and a pair of clamp members, one of said clamp members being attached to one of said opposite ends of said mounting bracket, the other of said clamp members being attachable to said one of said clamp members such that said clamp members can be fitted and secured about a portion of the bicycle frame.

17. The exercising device of claim 16 wherein said mounting assembly also includes means for connecting said mounting bracket to another portion of the bicycle frame at a location on said mounting bracket between said opposite ends thereof.

18. The exercising device of claim 13 wherein said mounting attachment has a support member with a bifurcated end connected to said mounting assembly about said vertical axis, and a pair of spaced tabs connected to and extending in upwardly inclined relationship from said support member, said tabs receiving said swingarm therebetween and pivotally mounting said swingarm.

* * * * *